March 10, 1925. Re. 16,018
W. CANFIELD
GAS CLAMP FOR OIL WELL CASINGS
Original Filed April 12, 1922 2 Sheets-Sheet 1
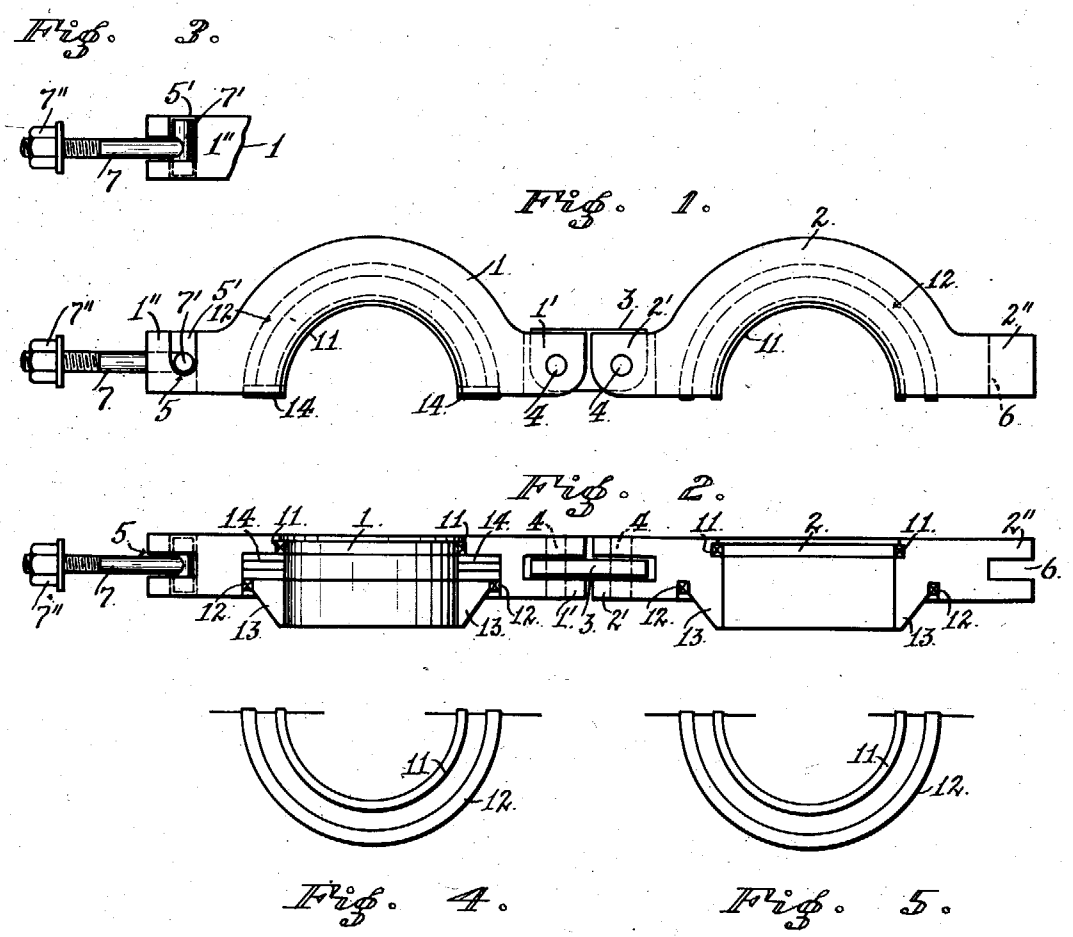
INVENTOR
Wallace Canfield
BY Booth & Booth
ATTORNEYS.

March 10, 1925. Re. 16,018

W. CANFIELD

GAS CLAMP FOR OIL WELL CASINGS

Original Filed April 12, 1922 2 Sheets-Sheet 2

INVENTOR
Wallace Canfield
BY Booth & Booth
ATTORNEY

Reissued Mar. 10, 1925. Re. 16,018

UNITED STATES PATENT OFFICE.

WALLACE CANFIELD, OF TAFT, CALIFORNIA.

GAS CLAMP FOR OIL-WELL CASINGS.

Original No. 1,448,285, dated March 13, 1923, Serial No. 551,829, filed April 12, 1922. Application for reissue filed September 9, 1924. Serial No. 736,774.

*To all whom it may concern:*

Be it known that I, WALLACE CANFIELD, a citizen of the United States, residing at Taft, in the county of Kern and State of California, have invented certain new and useful Improvements in Gas Clamps for Oil-Well Casings, of which the following is a specification.

My invention relates to the well-drilling art and particularly to devices and appliances usually termed gas-clamps, the purpose of which is to shut off the space between the outer or anchored string of casing and the inner or working string of casing.

In drilling oil wells in certain localities where flowing wells are expected, it is desirable to provide against a blow-out from the space between the two casing strings, this object being attained by the so-called gas-clamps which, by closing said space, serve the purpose.

The object of my invention is to provide a device or appliance of this class, which is dependable, is easy to adjust, and is effective.

To this end, my invention consists in the novel gas-clamp which I shall hereinafter fully describe by reference to the accompanying drawings, in which—

Fig. 1 is a top-plan view of my gas-clamp, showing it in the form of hinged sections opened out in extended position.

Fig. 2 is an elevation of the same looking at it from the inside.

Fig. 3 is an elevation of the bolt receiving extremity of one of the clamp members, showing the fitting of the bolt thereto.

Figs. 4 and 5 are views of the arcuate sections of the packing to be fitted in the upper and lower groove seats of the clamp-members.

Figure 6:
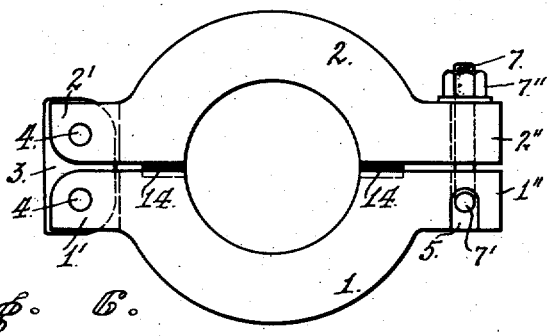
Fig. 6 is a top plan view of my hinged clamp showing it closed.

1 and 2 are symmetrical, complemental clamp-members, with arcuate faces substantially semicircular in extent. These clamp-members are adapted to embrace the inner casing and to be secured and held thereon in any suitable manner. In the form here shown they are hinged together and locked as I shall now describe.

Each member is formed with end extensions, those designated by 1′ and 2′ being vertically slotted to receive between them the hinge-link 3 to which they are pivoted by the rivets 4. In the other extensions 1″ and 2″ of the members 1 and 2, respectively, are made locking seats 5 and 6. The seat 5 is T-shaped to receive the T-head 7′ of the locking bolt 7, one side of the seat being left open as shown at 5′ in Fig. 3, to permit the bolt head to be readily fitted to place. The other seat 6 is a plain groove to receive the bolt shank.

7″ is a nut on the bolt. It will now be seen, by reference to Fig. 6, that the clamp-members may be turned about their hinge link 3 to a closed position, and secured by the locking bolt 7 and its nut 7″.

Figure 7:
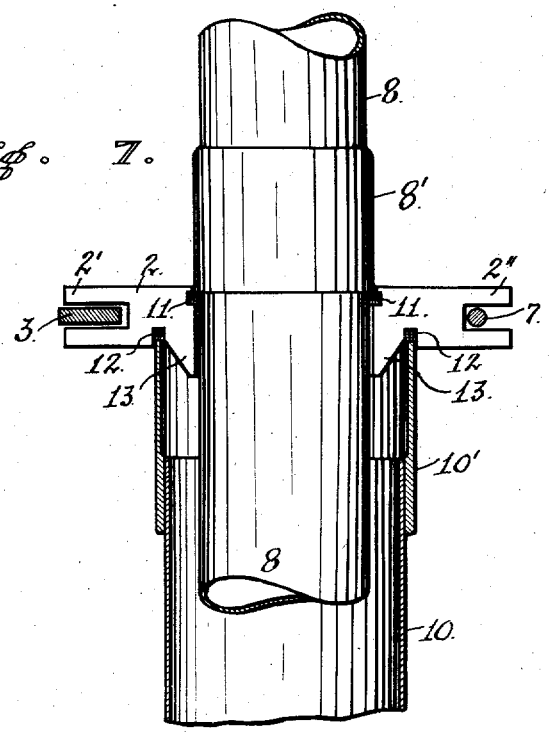
Fig. 7 is a vertical sectional view, partly in elevation, of my clamp showing it applied to the inside and outside casings to close the space between them.

In the upper edge of the arcuate face of each clamp-member is made a groove in which is seated a section of packing 11, said groove being so shaped as to form a base equal in width to and fully supporting the packing, as seen in Figs. 2 and 7, and a relatively narrower top to permit the partial exposure of the upper surface of the packing. In the lower surface of each clamp-member, exterior to and concentric with its face, is made a groove in which is seated a section of packing 12, the lower surface of which is exposed as seen in Figs. 2 and 7.

Each clamp-member, between the inner side of the packing 12 and its arcuate face is tapered downwardly to form a guide portion 13.

In the clamp member 1 on its inner surface at each side of its arcuate face is made a socket to seat a block of packings 14, the surface of said block projecting slightly from the seat as seen in Figs. 1 and 6, its upper inner edge forming a joint against the packing 11 and its lower outer edge joining the packing 12, as seen in Fig. 2.

In Fig. 7, to which reference is now made, the application of my gas-clamp to the well casings will be seen. 8 is the string of inner or working casing, and 8′ is a collar connecting two lengths of said string. 10 is the outer or anchored casing with a collar 10′.

The collar 8′ bears on the packing 11;

the collar 10′ bears on the packing 12; the guide portion 13 lying in the space between the two casings; and the packing block 14, forming a joint with the packings 11 and 12 and sealing the inner faces of the clamp members as seen in Fig. 6.

To apply the device, after its parts are assembled and the several packings driven into their seats, the clamp is placed around the working string of casing 8, under its collar 8′, and the locking bolt 7 is swung to place and tightened by its nut 7″. The working string of casing is then set down in the outer casing 10. The tapered guide portion 13 will bring the bottom packing 12 accurately into contact with the collar 10′ of said outer casing, and will also serve to hold the clamp together until the locking nut 7″ is set up, thus effectively shutting off the space between the two casings.

Due to the fact that all the packings are well supported on all sides when in use, they may be used a number of times and not renewed each time the clamp is used, as with ordinary gas clamps. The gas-clamps in common use comprise two halves bolted together at each end with gaskets between them and with a groove in the bottom to fit the collar of the outer casing, a ring of packing being inserted after the gas clamp is in place. The bottoms of these clamps are flat and the packing must be guided on top of the lower collar which is sometimes very difficult when the working string of casing is heavy and hangs slightly out of line. The packing at the top is wrapped around the working string of casing under a collar and set in a groove on top of the clamp.

To put on and adjust a gas clamp of this kind, that is, place the gaskets and packing, bolt together and guide into place, takes considerable time often as much as thirty minutes. When an actual blow out occurs it is often impossible to place this type of gas clamp on account of the gas and oil coming from between the strings of casing interfering so greatly with the work. At such times the working string of pipe may be frozen up or the well actually lost. But my gas clamp can be placed on the working string of casing in a few seconds, even when considerable gas and oil are coming from between the two strings and when set down the packing and gaskets are automatically drawn into place and the space between the two strings of casing effectively sealed. The clamp is thus easy to adjust and is effective and dependable.

I claim:

1. A gas-clamp for well-casing, comprising a pair of complemental clamp-members adapted to embrace the inner casing; a hinge connection between said clamp-members adapting them to be fitted to said casing; a locking member to hold them on the casing; and packing members carried by said clamp members and adapted to bear on a collar of the inner casing and on a collar of the outer casing, respectively, to close the space between said casings.

2. A gas-clamp for well-casing, comprising a pair of complemental clamp-members adapted to embrace the inner casing; a hinge connection between said clamp-members adapting them to be fitted to said casing; a locking member to hold them on the casing; packing members carried by said clamp members and adapted to bear on a collar of the inner casing and on a collar of the outer casing, respectively, to close the space between said casings; and other packing members forming joints with said first named packing members to seal the space between the clamp-members.

3. A gas-clamp for well-casings comprising a pair of complemental clamp-members adapted to embrace the inner casing; a hinge connection between said clamp-members adapting them to be fitted to said casing; a lock bolt pivotally mounted in the free extremity of one of said clamp-members and adapted to engage the free extremity of the other of said clamp-members; a nut on said bolt to set it in locked position; and packing members carried by said clamp-members and adapted to bear on a collar of the inner casing and on a collar of the outer casing respectively, to close the space between said casings.

4. A gas-clamp for well-casings comprising a pair of complemental clamp members adapted to embrace the inner casing; a hinge connection between said clamp-members adapting them to be fitted to said casing; a lock bolt pivotally mounted in the free extremity of one of said clamp-members and adapted to engage the free extremity of the other of said clamp-members; a nut on said bolt to set it in locking position; packing members carried by said clamp-members and adapted to bear on a collar of the inner casing and on a collar of the outer casing respectively, to close the space between said casings; and other packing members forming joints with said first named packing members to seal the space between the clamp members.

5. A gas-clamp for well-casings comprising a pair of complemental clamp-members adapted to embrace the inner casing; a hinge connection between said clamp-members adapting them to be fitted to said casing; a locking member to hold them on the casing; a packing member seated in the upper edge of the clamping face of each clamp-member and adapted to bear on a collar of the inner casing; and a packing member seated in the under side of each clamp-member and adapted to bear on a collar of the outer casing, whereby the space between said casings is closed.

6. A gas-clamp for well-casings comprising a pair of complemental clamp-members adapted to embrace the inner casing; a hinge connection between said clamp-members adapting them to be fitted to said casing; a locking member to hold them on the casing; a packing member seated in the upper edge of the clamping face of each clamp-member and adapted to bear on a collar of the inner casing; a packing member seated in the under side of each clamp-member and adapted to bear on a collar of the outer casing, whereby the space between said casings is closed; and other packing members seated in the inner face of one of said clamp-members between and forming joints with said first named packing members, to seal the space between the clamp-members.

7. A gas-clamp for well-casings comprising a pair of complemental clamp-members adapted to embrace the inner casing; a hinge connection between said clamp-members adapting them to be fitted to said casing; a lock bolt pivotally mounted in the free extremity of one of said clamp members and adapted to engage the free extremity of the other of said clamp-members; a nut on said bolt to set it in locked position; a packing member seated in the upper edge of the clamping face of each clamp-member and adapted to bear on a collar of the inner casing; a packing member seated in the under side of each clamp-member and adapted to bear on a collar of the outer casing, whereby the space between said casings is closed; and other packing members seated in the inner face of one of said clamp-members between and forming joints with said first named packing members, to seal the space between the clamp-members.

8. A gas-clamp for well-casings comprising a pair of complemental clamp-members adapted to embrace the inner casing, said members having downwardly tapered lower portions adapted to guide them into the outer casing; a hinge connection between said clamp-members adapting them to be fitted to said casing; a locking member to hold them on the casing; and packing members carried by said clamp members and adapted to bear on a collar of the inner casing and on a collar of the outer casing, respectively, to close the space between said casings.

9. A gas-clamp for well-casings comprising a pair of complemental clamp-members adapted to embrace the inner casing, said members having downwardly tapered lower portions adapted to guide them into the outer casing; a hinge connection between said clamp-members adapting them to be fitted to said casing; a lock bolt pivotally mounted in the free extremity of one of said clamp-members and adapted to engage the free extremity of the other of said clamp-members; a nut on said bolt to set it in locked position; a packing member seated in the upper edge of the clamping face of each clamp-member and adapted to bear on a collar of the inner casing; a packing member seated in the under side of each clamp-member and adapted to bear on a collar of the outer casing, whereby the space between said casings is closed; and other packing members seated in the inner face of one of said clamp-members between and forming joints with said first named packing members, to seal the space between the clamp-members.

10. A gas-clamp for well-casings comprising complemental clamp-members adapted to embrace an inner casing; means for holding them on said casing; a packing member seated in the clamping face of said clamp-members, adapted to bear on a collar of the inner casing; and a packing member seated in the under side of said clamp-members adapted to bear upon a collar of an outer casing, to close the space between said casings.

11. A gas-clamp for well-casings comprising complemental clamp-members adapted to embrace an inner casing; means for holding them on said casing; a packing member seated in the clamping face of said clamp members, adapted to bear on a collar of the inner casing; a packing member seated in the under side of said clamp-members, adapted to bear upon a collar of an outer casing, to close the space between said casings; and other packing members seated in said clamp-members between and forming joints with said first named packing members, to seal the space between the clamp-members.

12. A gas-clamp for well-casings comprising complemental clamp-members adapted to embrace an inner casing, said members having downwardly tapered lower portions adapted to guide them into an outer casing; means for holding said clamp-members upon the inner casing; and packing members carried by said clamp-members, adapted to bear on a collar of the inner casing and on a collar of the outer casing, respectively, to close the space between said casings.

13. A gas-clamp for well-casings comprising complemental clamp-members adapted to embrace an inner casing, said members having downwardly tapered lower portions adapted to guide them into an outer casing; means for holding said clamp-members upon the inner casing; a packing member seated in the clamping face of said clamp-members, adapted to bear on a collar of the inner casing; and a packing member seated in the under side of said clamp-members, adapted to bear upon a collar of the outer casing, to close the space between said casings.

14. A gas-clamp for well-casings comprising complemental clamp-members adapted to embrace an inner casing, said members having downwardly tapered lower portions adapted to guide them into an outer casing; means for holding said clamp-members upon the inner casing; a packing member seated in the clamping face of said clamp-members, adapted to bear on a collar of the inner casing; a packing member seated in the under side of said clamp-members, adapted to bear upon a collar of the outer casing to close the space between said casings; and other packing members seated in said clamp-members between and forming joints with said first named packing members, to seal the space between the clamp-members.

In testimony whereof I have signed my name to this specification.

WALLACE CANFIELD.